Figure 1:
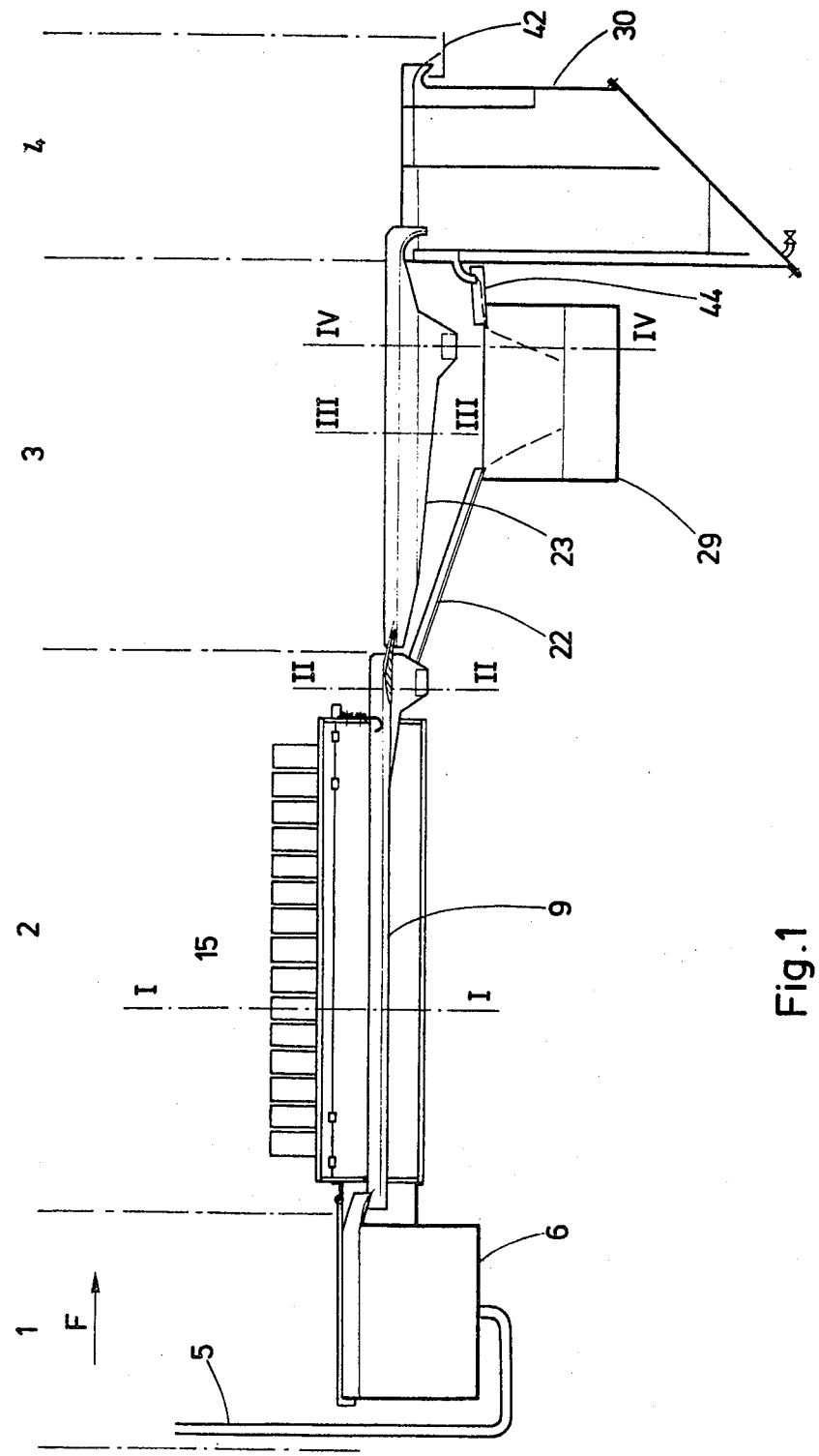

United States Patent [19]

Entremont et al.

[11] 4,405,651

[45] Sep. 20, 1983

[54] PROCESS FOR CONTINUOUSLY SEPARATING FAT FROM BUTTER

[75] Inventors: Jacques Entremont, Veyrier du Lac; Raymond Levardon, Paris, both of France

[73] Assignee: Entremont S.A., Annecy, France

[21] Appl. No.: 253,348

[22] Filed: Apr. 13, 1981

[30] Foreign Application Priority Data

Apr. 29, 1980 [FR] France .............................. 80 10117
Jan. 21, 1981 [FR] France .............................. 81 01073

[51] Int. Cl.³ .............................................. A23C 15/14
[52] U.S. Cl. .................................. 426/241; 426/581; 426/417; 426/491
[58] Field of Search .............. 426/241, 242, 491, 581, 426/417

[56] References Cited

U.S. PATENT DOCUMENTS

| | | | |
|---|---|---|---|
| 1,651,028 | 11/1927 | Johnson | 426/491 X |
| 1,837,205 | 12/1931 | McCloukey et al. | 426/491 X |
| 3,469,996 | 9/1969 | Endres et al. | 426/241 |
| 3,519,435 | 7/1970 | MacCollom | 426/491 X |
| 3,772,447 | 11/1973 | Damerow | 426/491 X |
| 4,073,951 | 2/1978 | Sargeant | 426/241 X |

FOREIGN PATENT DOCUMENTS

| | | | |
|---|---|---|---|
| 1187766 | 4/1970 | United Kingdom | 426/241 |
| 1222208 | 2/1971 | United Kingdom | 426/241 |

OTHER PUBLICATIONS

Decareau, R. V., "For Microwave Heating Tune to 915 Mc or 2450 Mc", Food Engr., Jul. 1965, pp. 54, 55.

*Primary Examiner*—Robert A. Yoncoskie
*Attorney, Agent, or Firm*—Seidel, Gonda, Goldhammer & Panitch

[57] ABSTRACT

This invention concerns a process for the continuous separation of fatty substance from butter, wherein molten butter is irradiated with microwaves. A layer of molten butter in a condition of laminar flow is irradiated, the thickness of said layer being less than the depth of penetration of the microwaves and the amount of energy imparted to the molten butter by the microwaves being such that irradiation raises the temperature of the molten butter only by a few degrees Celsius at maximum.

5 Claims, 8 Drawing Figures

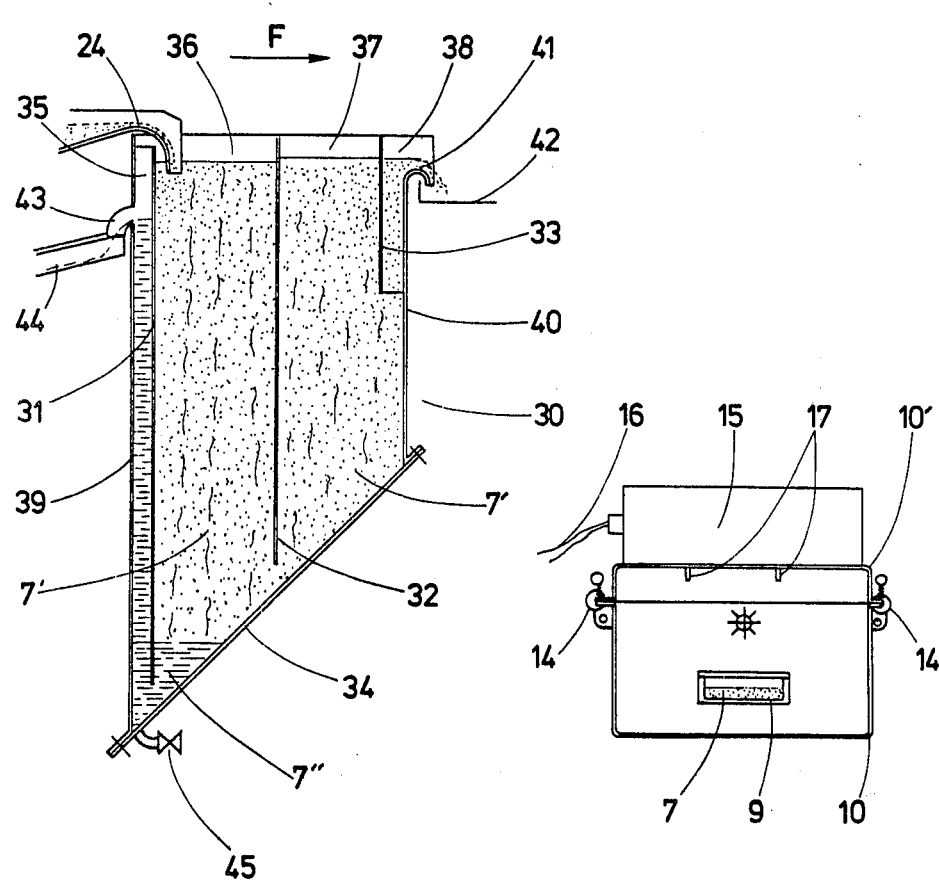
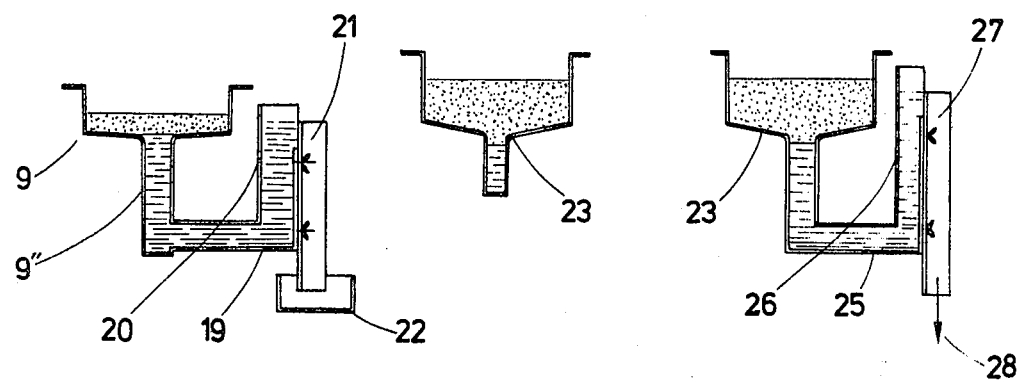
Fig. 4  Fig. 5
Fig. 6  Fig. 7  Fig. 8

PROCESS FOR CONTINUOUSLY SEPARATING FAT FROM BUTTER

The invention relates to a process for continuously separating fat from butter.

Butter essentially comprises about 82% of fat, about 16% of water and about 2% of proteins. Extracting from the butter, the fat which is free of proteins and which is virtually anhydrous, that is to say, which contains only 0.1% of water at a maximum, is a matter of the greatest interest. Indeed, the anhydrous fat can be preserved without deterioration for very long periods under much more economical conditions than butter itself, namely, by simply storing it in a condition of being protected from the oxygen in the air. At the end of the preservation period, butter or milk can be reconstituted from the anhydrous fat, by the suitable addition of water and proteins such as for example casein.

Therefore, this anhydrous fat produced by extraction from butter is an excellent solution for supplying dairy products to countries which are remote from the centres of dairy production and in which the climatic conditions and the insufficient number of cold room installations, together with the lack if financial means for setting up such installations, prevent the export of milk or butter.

This is therefore a very substantial and very wide market which is available for the sale of anhydrous fat extracted from butter, and it is this factor which justifies the extent of the research undertaken to permit such an extraction operation to be performed, under the best possible conditions.

Hitherto, separating butter into its constituents generally involved centrifuging processes. In such processes, the butter, which is molten, at a temperature of about 55° C., is subjected to two successive centrifuging operations. The fat content of the product resulting from the first operation is of the order of 95%, while the fat content of the product resulting from the second operation is of the order of 99.5%. This product is then treated in an assembly for drying and degassing under vacuum, which reduces the moisture content of the fat to 0.1%. After pasteurisation, the fat is cooled and packaged.

These known processes are complex and expensive to perform. They involve relatively long operating times, with the total duration of the treatment being more than 10 hours. The centrifuging installations involve high levels of capital investment, operating and maintenance costs, for relatively low rates of unit production. They are also liable to breakdowns in operation, which impair the productivity of the assembly.

The aim of the present invention is to overcome these disadvantages and for that purpose to provide a process for separating the constituents of butter, the performance of which involves installations which are much less complex than centrifuging installations and much less burdensome than centrifuging installations from the threefold point of view of capital investment, operation and maintenance. Such installations are also less liable to mishaps and are much more reliable than centrifuging installations. In addition, and this is a very substantial advantage of the process according to the invention, the operating times are spectacularly reduced. The very short operating times, combined with the simplicity and reliability of the installations used, make it possible considerably to reduce, for the same amount of product, the costs of productive labour, in comparison with the known processes, and this, combined with the savings in regard to capital investment, and other costs of operating and maintaining the equipment, results in a highly advantageous reduction in the cost price of the anhydrous fat which is extracted from butter.

The process according to the invention, which enjoys the above-indicated advantages, essentially comprises subjecting the butter to a specific microwave treatment.

The expression 'microwave' is used herein in its normal sense in French, that is to say, to denote electromagnetic waves, also referred to as ultra-high frequency waves (UHF waves), the wavelength of which is of the order of a centimeter, that is to say, the frequency of which is between 1000 and 30,000 MHz. In practice, in France, of the whole range of radio-electric or electro-magnetic waves, the frequency of 2.450 GHz, the wavelength of which is 12.2 centimeters, has essentially been retained, for industrial uses, for 'microwaves', with that frequency being standardised. Of course, microwave treatment of food materials and in particular food fats such as butter is already known. The aim of such treatment is generally to effect substantial re-heating of the food. Thus, microwave treatments are used to raise the temperature of frozen foods to temperatures which may be several tens of degrees Celsius above zero, or to raise cooked dishes which have previously been maintained at a few degrees above zero, to the same kinds of temperature. In all these known uses of microwaves on foods, measures are consequently taken in order to develop the maximum amount of heat energy within the food, and in order as far as possible to avoid the heat energy being dissipated to the exterior of the treatment chamber.

The measures which are effected in accordance with the present invention for the treatment of butter with microwaves are totally different from the known measures referred to hereinbefore. Indeed, they do not seek to effect substantial heating of the butter, but on the contrary as far as possible to limit the increase in temperature of the butter in order to effect optimum separation as between the fat and the other constituents of the butter.

The research undertaken by the present applicants have shown in fact that irradiation of the melted butter by microwaves very rapidly caused separation as between the fatty substance of the butter and the other constituents thereof, that is to say, water and proteins. It will be appreciated that this new effect of microwaves, which is revealed by the applicants and which forms the basis of the present invention, is accompanied by the previously known heating effect and the temperature of the molten butter rises in the course of the microwave treatment, slowly at the beginning but more rapidly when the treatment is continued. Experiments carried out by the applicants have shown that optimum separation of the constituents of butter was achieved after a very short microwave irradiation time and that the optimum result achieved in that way tended to deteriorate if the treatment was prolonged. Although at the present time this is only a hypothesis which is in the course of being verified, it can be assumed that the deterioration in the result achieved in separating the constituents of butter results from convection currents which are produced in the mass of molten butter by the increase in temperature.

In practice, tests have shown that the degree of purification of the 'fatty substance' phase reached 99.5% after irradiation for about one minute, the temperature rise then being of the order of 6° C. Continuing the treatment resulted in a fall in the level of purification and an increasingly rapid rise in temperature.

In consequence, the process for the microwave treatment of butter, in accordance with the invention, is characterised in that microwave irradiation is effected on a layer of molten butter at rest and in a condition of laminar flow, the amount of ultra-high frequency energy absorbed by the molten butter and monitored by the increase in the temperature of the butter being so determined that the increase in temperature remains at a low value, in particular at most equal to 6° C.

The invention also concerns an assembly of apparatuses for continuously separating fat from butter, for carrying out the process according to the invention.

Figure 2:
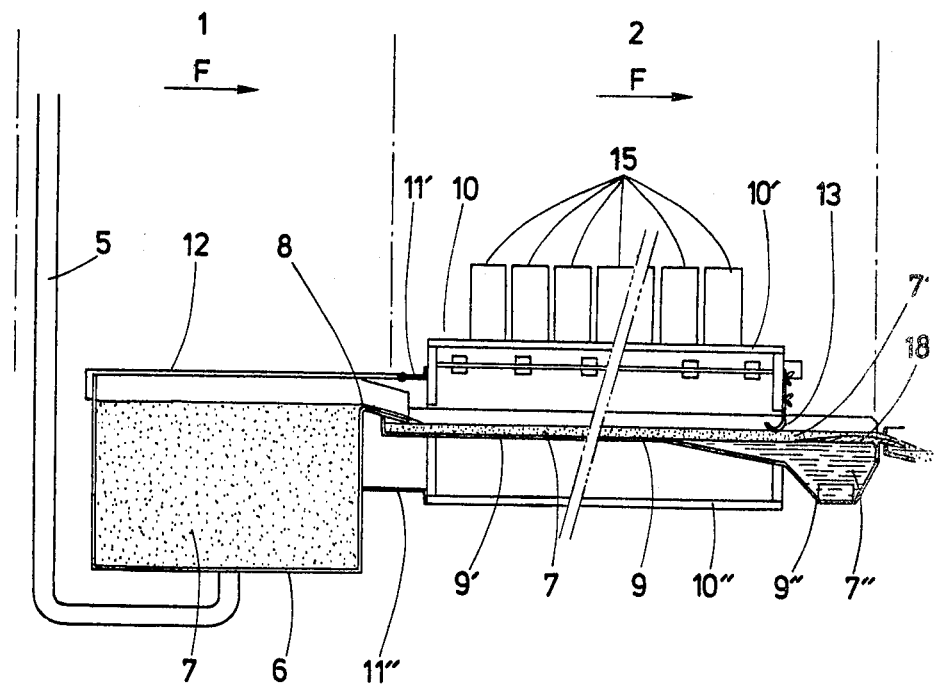
Figure 3:
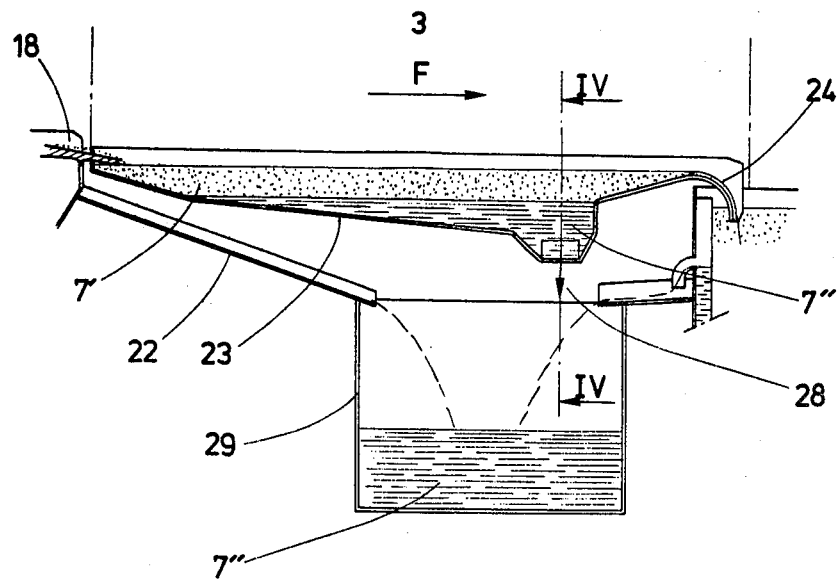

The assembly of apparatuses will be described with reference to non-limiting embodiments as shown in the accompanying drawings in which:

FIG. 1 is a diagrammatic view in longitudinal section of an embodiment of an assembly of apparatuses in accordance with the invention, FIG. 2 is a diagrammatic view in longitudinal section on a larger scale of the feed, microwave treatment and pre-settling part of the assembly shown in FIG. 1, FIG. 3 is a diagrammatic view in longitudinal section on a larger scale of the intermediate settling apparatus of the assembly shown in FIG. 1, FIG. 4 is a diagrammatic view in longitudinal section on a larger scale of the terminal settling apparatus of the assembly shown in FIG. 1, FIG. 5 is a view in cross-section taken along line I—I in FIG. 1, FIG. 6 is a view in cross-section taken along line II—II in FIG. 1, FIG. 7 is a view in cross-section taken along line III—III in FIG. 1, and FIG. 8 is a view in cross-section taken along line IV—IV in FIG. 1.

FIG. 1 is a diagrammatic view in longitudinal section of an embodiment of an assembly of apparatuses in accordance with the invention, for continuously separating fat from butter.

In this assembly, the molten butter and the constituents which are produced therefrom circulate from the left of the drawing towards the right, in the direction indicated by arrow F.

In that direction of circulation, the assembly comprises, in a downstream direction:
 a feed apparatus 1,
 a microwave treatment and pre-settling apparatus 2,
 an intermediate settling apparatus 3, and
 a terminal settling apparatus 4.

All these apparatuses, and the assembly thereof, have a common longitudinal plane of symmetry parallel to the planes of FIGS. 1 to 4.

The various apparatuses 1 to 4 will now be described with reference to FIGS. 2 to 8.

FIG. 2 is a diagrammatic view in longitudinal section on a larger scale of the apparatuses 1 and 2 forming part of the assembly shown in FIG. 1.

The feed apparatus 1 essentially comprises a conduit 5 for the supply of molten butter, which is connected at its downstream end to the lower part of a storage vat or tank 6. The upstream end of the feed conduit 5 is connected to a butter melting installation which comprises either a double-jacket heater tube or melting pots with a rotary bottom and a double jacket. Such a melting installation is conventional and known per se and there is therefore no need to describe it in greater detail or to illustrate it in the drawings.

The feed conduit 5, or indeed the melting installation which precedes the conduit 5, is provided with a means for controlling the flow of butter, which makes it possible for the butter flow rate to be adapted to the operating requirements of the treatment apparatus 2 and the settling apparatuses which follow it. Flow control means of this kind are also known per se and there is no need for them to be described or illustrated. They may comprise in particular an adjustable-flow butter pump which is disposed at the intake of the melting installation and which is supplied with butter in pasty or viscous form at a temperature in the region of 15° C.

The butter issuing from the melting installation in liquid form at a temperature close to 55° C. is passed by the conduit 5 into the lower part of the storage tank 6. The tank 6 and the conduit 5 are heat-insulated in order to ensure that the molten butter 7 does not congeal on the walls thereof.

The outlet of the tank 6 is formed by a level overflow means 8 which maintains a constant level of liquid butter 7 in the storage tank 6 and which also provides for a laminar flow of the molten butter to the treatment apparatus which is disposed downstream thereof.

The microwave treatment apparatus 2 comprises a channel 9 which is substantially horizontal and which is upwardly open in the embodiment illustrated, being made of a material which is permeable to microwaves such as a metacrylic resin or preferably tetrafluoroethylene (TEFLON). The upstream part 9' of the channel 9 is of a cross-sectional shape in the form of a flattened U-configuration (see FIG. 5), while the downstream part 9" thereof is of a cross-sectional shape of T-configuration (see FIG. 6).

The molten butter 7 which is passed into the channel 9 by the overflow means 8 of the storage tank 6 flows with a laminar flow in the channel 9, forming in the upstream part 9' of the channel, a layer which is a few centimeters in thickness and which is permeable to microwaves.

Except for its two ends, the channel 9 is disposed in a chamber 10 which comprises an electrically conducting material which is therefore opaque in respect of microwaves, such as for example stainless steel sheet. Screening means 11', 11", and a screening means 12 covering the storage tank 6 prevent any microwave propagation between the interior of the chamber 10 and the outside atmosphere, at a position upstream of the chamber 10. Likewise, a flap means 13 which is adjustable in height and which is made of an electrically conducting material and which comes into contact with the surface of the bath of molten butter 7 prevents microwaves from being emitted in a downstream direction from the chamber 10.

The chamber 10 comprises two parts, a cover 10' and a lower part 10" which are fitted together by a labyrinth-type arrangement in order to prevent propagation of microwaves to the exterior and which are removably connected together by per se known lockable and unlockable connecting means 14 such as eccentric-type or toggle-type catch means.

The cover 10' of the chamber 10 carries a certain number of microwave generators 15 which each essentially comprise a magnetron and which are each connected by conductors 16 to an electrical power source (not shown), each of the generators emitting microwaves into the inside space in the chamber 10 by way of an antenna 17. The antennae 17 of two ultra-high frequency generators 15 which are disposed in succession in the longitudinal direction of the chamber 10 are symmetrically offset with respect to each other (see FIG. 4), on respective sides of the longitudinal axial plane of the chamber 10, so that the antennae 17 of the different generators 15, when viewed in plan, are disposed in a staggered arrangement of rows, thus providing for more uniform distribution of the ultra-high frequency electro-magnetic fields within the chamber 10.

The downstream part 9' of the channel 9, the end of which projects out of the chamber 10, will now be described in greater detail.

As mentioned hereinbefore, while the upstream part 9' of the channel 9 is of a cross-sectional shape in the form of an upwardly open, flattened U-configuration, the downstream part 9" thereof is of a cross-sectional shape in the form of an upwardly open T-configuration (see FIG. 6). The height of the vertical leg of the T-shape progressively increases (see FIGS. 1 and 2) as far as the transverse plane indicated by II—II in FIG. 1, so as to permit a first settling effect in respect of the part 7" of the molten butter 7, being the part containing water and proteins, while the part 7' which essentially comprises fatty substance floats on the part 7".

The downstream end of the part 9" of the channel 9 is provided with a level overflow means 18 which is possibly controllable and which makes it possible to adjust the level of molten butter 7 in the channel 9 and thereby to define the thickness of the layer of molten butter which is subjected to the effect of microwaves in the channel 9.

In the region of the transverse plane indicated by II—II in FIG. 1, a horizontal duct portion 19 followed by a vertical duct portion 20 is connected to the downstream end part 9" of the chamber 9. The vertical duct portion 20 is itself provided with a controllable flap means 21 which, above a predetermined level, permits the pre-settled part 7" of the butter 7, which contains a fraction of the water and the proteins, to flow into a discharge channel 22 (see FIG. 3).

FIG. 3 shows a diagrammatic view in longitudinal section of the intermediate settling apparatus 3 of the assembly shown in FIG. 1.

The intermediate settling apparatus 3 essentially comprises an upwardly open horizontal channel 23 which is supplied with molten fat 7' from the channel 9 by way of the overflow means 18, the discharge from the horizontal channel 23 being by way of a level overflow means 24.

The cross-sectional shape of the channel 23 is that of a T. The height of the vertical leg of the T-shape increases from the upstream end of the channel 23 as far as a transverse plane indicated by IV—IV in FIGS. 1 and 3. Two successive views of the T-shaped cross-section are shown in FIGS. 7 and 8. The increases in the height of the vertical leg of the T-shape permits progressive settling of the part 7" which contains water and proteins and which is not extracted in the pre-settling part 9" of the channel 9 from the butter 7, while the part 7' of the butter 7, which contains the fatty substance, floats on the above-mentioned part 7".

In the region of the transverse plane indicated by IV—IV in FIGS. 1 and 3, the above-mentioned part 7" of the butter is extracted, above a predetermined and adjustable level, by means of an arrangement comprising a horizontal duct portion 25, a vertical duct portion 26 and an adjustable flap means 27, this arrangement being entirely similar to that described in relation to the pre-settling apparatus, and disposed in the region of the transverse plane indicated by II—II in FIG. 1.

The part 7" of the molten butter 7 which is thus extracted from the intermediate settling apparatus 3 falls in the direction indicated by arrow 28 into a collecting vat or tank which is also fed by the discharge channel 22 from the pre-settling apparatus and the discharge channel 44 from the terminal settling apparatus 4.

The channel 23, the collecting tank 29 and the discharge channels 22 and 24 are preferably made of stainless steel sheet but they may also be made of any other suitable material. When made from stainless steel sheet, the channel 23 is heat-insulated on its outside.

The width of the channel 23 may be different from that of the channel 9 and in particular may be wider, in order to reduce the speed of flow of the product 7'. Still for the same purpose, the difference in level between the overflow means 24 and the bottom of the widest part of the channel 23 may be greater than the difference in level between the overflow means 18 and the bottom of the widest part of the channel 9.

FIG. 4 shows the terminal settling apparatus 4 which essentially comprises a heat-insulated settling tank 30 which is open upwardly and which is preferably of rectangular horizontal section.

Two partitioning walls 31 and 32 which are perpendicular to the longitudinal plane of symmetry of the apparatus and which project from the upper part of the settling tank 30 and extend downwardly to a small distance from the bottom 34 divide the settling tank 30 into three parts 35, 36 and 37 which communicate with each other at the bottom. In addition, a partitioning wall 33 which is parallel to the partitioning walls 31 and 32 but which extends only over about a quarter of the total height of the tank 30, in the upper part thereof, forms an outlet space 38 adjoining the downstream wall 40 of the settling tank 30.

The settling tank 30 is supplied with fatty substance 7' by way of the overflow means 24 of the intermediate settling apparatus 3. After a fresh settling operation, the fatty substance is discharged by the downstream overflow means 41 into a channel 42 which carries the fatty substance to other treatment installations which are not part of the present invention, such as pasteurisation and packaging installations.

The mixture of water and proteins 7", which is separated from the fat in the course of the final settling operation in the tank 30, is discharged by way of the space 35 provided between the internal partitioning wall 31 and the upstream wall 39 of the tank 30, and passes into the discharge channel 44 by way of a delivery pipe 43.

The mode of operation of the assembly of apparatuses being the subject of this invention may already be clearly deduced from the successive pieces of description set out hereinbefore. However, a general description of the treatment process will now be set forth in brief terms.

The liquid butter 7 which arrives from the melting installations by way of the conduit 5 at a temperature of the order of 50° C., with its flow rate being controlled, is provisionally stored at a constant level in the tank 6, the volume of which is sufficiently large for the upper layers of the bath of liquid butter to be protected from disturbances.

The liquid butter flows by way of the overflow means 8 of the storage tank 6 into the channel 9 of the microwave treatment apparatus. Immediately after the overflow means 8, a laminar flow condition is established in the channel 9.

The microwaves which are emitted by the antennae 17 of the ultra-high frequency generators 15 act on the molten butter 7 which forms a layer of from 2 to 4 cm in thickness. The time for which the butter is exposed to the ultra-high frequency electromagnetic field is of the order of one minute and the power absorbed is monitored by the rise in temperature of the butter, the temperature rise being given by differentiation of the data supplied by thermometric probes or sensing means (not shown) which are disposed respectively at the intake and at the outlet of the channel 9. The power absorbed is so controlled that the increase in temperature of the molten butter, between the intake and the outlet of the channel 9, does not exceed for example 6° C. This adjustment operation may be effected automatically on the basis of the differential data provided by the thermometric sensing means.

This microwave treatment, which is of a duration of the order of a minute, is sufficient to produce a very clear separation between the fat and the other constituents of the butter, namely water and proteins. The two phases which are separated in this way undergo a first settling operation in the pre-settling apparatus which is disposed at the outlet of the channel 9, in the region of the transverse plane in II—II. The fat is discharged by way of the overflow means 18 while the mixture of water and proteins is discharged by way of the channel 22 into the tank 29.

The fat is subjected to a second settling operation in the channel 23 of the intermediate settling apparatus 3, the fat then being discharged by way of the overflow means 24 while the mixture of water and proteins is discharged directly into the tank 29.

Finally, the fat undergoes a last settling operation in the settling tank 30 and is discharged by way of the overflow means into the channel 42, while the water-protein mixture is discharged by way of the outlet pipe 43 and the channel 44 into the tank 29.

The fatty substance discharged by way of the channel 42 has a content of about 99.5%. As in the known installations, it may then be dehydrated in a vacuum drier-degasser so as to be adjusted to a content of close to 99.9%. It is then pasteurised and packaged.

In contrast to the conventional installations which involve synchronisation, the assembly of apparatuses in accordance with the invention does not involve complex mechanisms which consume large amounts of power. The only substantial consumption of power is that used for producing the microwaves and, taking into account the short period of time for which microwave irradiation is effected, that consumption, relative to a tonne of fat per hour, is relatively low.

The above-described arrangements are only given by way of non-limiting example of possible forms of the invention, and modifications may be made therein without thereby departing from the scope of the invention. Thus, it is possible to envisage omitting the pre-settling apparatus or the intermediate settling apparatus, or indeed omitting both those apparatuses at the same time. The capacity of the settling tank 30 would then have to be suitably altered in consequence.

The above-described arrangements were essentially designed for continuous extraction of fat from butter. However, they may easily be adapted for discontinuous extraction. In that case, the overflow means 18 is lowered to the level of the bottom of the upstream part of the channel 9 and the latter is closed at the downstream position by a flap means. Likewise, the pre-settling apparatus and the intermediate settling apparatus are omitted and, by way of discharge channels controlled by flap means, the treatment channel 9 can discharge selectively into any one of the three settling tanks which are disposed in a parallel arrangement and which are similar to the tank 30, except that the internal partitioning walls are omitted, as well as the overflow means 41 and 43, the tanks being emptied solely by way of a valve 45.

The channel 9 is filled with liquid butter by way of the feed apparatus 1 and then irradiated by microwaves. The molten butter is then discharged into one of the settling tanks, for example tank No 1. The channel 9 is re-filled and the above-described operations are repeated until settling tank No 1 is filled. Operation then goes on to tank No 2, while the contents of tank No 1 settle. The process then passes to tank No 3, while the contents of tank No 2 settle and the contents of tank No 1 are taken off by way of the valve 45, in two phases: first of all, water and proteins, and then the 99.5% fatty substance. Tank No 1 is then cleaned and returned to service, and the above-described sequence is then repeated.

It will be appreciated that discontinuous operation of the installation in that way corresponds to a much lower level of productivity from the installation. It is for that reason that continuous operation will generally be preferred. In order to give a good result as regards the quality of the fat produced, it is essential for the flow of molten butter and the constituents thereof through the assembly of apparatuses according to the invention to be of a laminar nature, the only disturbed regions being those of the overflow means, the length of which is negligible relative to the length of the settling regions.

The process according to the invention is not limited to the treatment of butter but may also be applied in essence to any other foodstuff materials in regard to which it is desired to remove water or another undesirable product that may be contained therein.

We claim:
1. A process for the separation of fat from butter comprising the steps of:
 (a) forming a layer of molten butter;
 (b) irradiating said molten butter with microwaves to such an extent that the increase in temperature of the molten butter due to said microwave irradiation does not exceed about 6° Celsius;
 (c) said layer of molten butter during said irradiation being in a condition of rest or laminar flow and having a thickness less than the depth of penetration of said microwaves; and
 (d) allowing the fat to separate from the molten butter after said microwave irradiation by settling of water and protein from the butter.

2. A process according to claim 1 wherein the microwaves having a frequency of about 2.45 GHz.

3. A process according to claim 1 or 2 wherein said process is continuous.

4. A process according to claim 1 or 2 wherein said process is a batch process.

5. A process according to claim 1 or 2 wherein said layer of molten butter is at a temperature of about 55° C. prior to said microwave irradiation.

* * * * *